United States Patent [19]

Hall et al.

[11] 4,413,573
[45] Nov. 8, 1983

[54] PROCESS FOR COMBUSTING CARBONACEOUS SOLIDS CONTAINING NITROGEN

[75] Inventors: Robert N. Hall, Boulder; Franklin B. Carlson, Broomfield, both of Colo.; William J. Thomson, Moscow, Id.

[73] Assignee: Tosco Corporation, Los Angeles, Calif.

[21] Appl. No.: 390,756

[22] Filed: Jun. 21, 1982

[51] Int. Cl.³ .............................. F23D 1/00
[52] U.S. Cl. .................................. 110/347; 110/263
[58] Field of Search ............... 110/347, 263, 264, 245; 431/2, 10, 115, 116

[56] References Cited

U.S. PATENT DOCUMENTS

| | | |
|---|---|---|
| 3,867,507 | 2/1975 | Myerson . |
| 4,132,209 | 1/1979 | Resler . |
| 4,253,409 | 3/1981 | Wormser ............................ 110/347 |
| 4,325,833 | 4/1982 | Scott ................................. 110/347 X |
| 4,326,471 | 4/1982 | Ruhrbach et al. ............... 110/347 X |
| 4,329,932 | 5/1982 | Takahashi et al. ................ 110/347 |

OTHER PUBLICATIONS

"Coal Combustion and No$_x$ Formation in an Experimental Fluidized Bed" Gibbs et al, Institute of Fuel Symposium Series No. 1.
"No/Char Reactions at Pulverized Coal Flame Conditions", Jul. 7, 1981, MIT Symposium.
"Mechanisms of No$_x$ Formation and Control" England et al, Eighteenth International Symposium on Combustion, Aug. 1980.
"Application of Advanced Technology for No$_x$ Control" Beer et al; AICHE Symposium Series; 1978.
"Low No$_x$ Combustors for High Nitrogen Fuels" England et al; Symposium on Stationary Combustion Control, Oct. 1980.

Primary Examiner—Edward G. Favors
Attorney, Agent, or Firm—David J. Oldenkamp; Lyle J. Schlyer

[57] ABSTRACT

A dual stage combustion system and process for achieving high fuel combustion efficiency and reduced nitric oxide emissions. Combustion is carried out in two stages. A first partial combustion carried out in an oxygen deficient atmosphere followed by a second complete carbon combustion in an oxidizing atmosphere. The second combustion step achieves complete fuel utilization, but generates a nitrogen oxide containing flue gas. The nitrogen oxide containing flue gas is passed to the first combustion step where it is removed by interaction with the partially combusted solids.

23 Claims, 2 Drawing Figures

PROCESS FOR COMBUSTING CARBONACEOUS SOLIDS CONTAINING NITROGEN

BACKGROUND OF THE INVENTION

The present invention relates generally to the combustion of nitrogen containing carbonaceous solids such as oil shale, spent shale, coal and tar sands. More specifically, the present invention relates to the combustion of carbon residues present in spent shale produced during production of shale oil from oil shale.

Oil shale is a Marlstone-type inorganic material mixed with an organic polymer called kerogen. The three major aspects of shale oil production are mining, crushing and retorting. The present invention has application to processes for retorting oil shale. As is well-known, kerogen in its natural form is not suitable for commercial use. Oil shale is typically pyrolyzed or retorted at elevated temperatures to decompose the kerogen to volatile product oils and gases. These pyrolysis product vapors are removed from the retort for condensation and fractionation.

The solid residue of processed oil shale remaining after pyrolysis is commonly referred to as spent shale. Spent shale typically will include a combustible carbonaceous residue in amounts ranging up to approximately 10 weight % and higher depending upon the source of the oil shale and the retorting conditions. This carbonaceous residue will typically contain from 0.2 weight percent to 0.8 weight percent nitrogen. The residue is usually distributed throughout the entire spent shale particle.

In order to prevent this combustible material from being discarded as waste, the combustible residue is combusted in a spent shale combustor at temperatures above pyrolysis conditions usually in the range of 1100° F. to 1700° F.. The heat generated by combustion of the carbonaceous residue is extracted from the combustor and may be utilized for various heat requirements throughout the process. The final residue remaining after spent shale combustion will usuallly contain less than 1% by weight carbon residue and is commonly referred to as shale ash.

In many pyrolysis processes, heat carrying bodies are added to the retort to provide the necessary heating for kerogen decomposition. In many processes utilizing heat carriers, the heat carriers are separated from the spent shale prior to combustion. In others, the heat carriers are passed along with the spent shale as a solids blend to the combustor where they are reheated during combustion of the spent shale.

When combusting carbonaceous fuels containing nitrogen compounds, such as spent shale, it is desirable to achieve essentially complete combustion of the fuel content of the solid. To achieve the desired complete combustion, an oxidizing atmosphere which includes an excess of oxygen must be utilized. However, when combustion is carried out in such an oxidizing atmosphere, the nitrogen compounds present in the solids are oxidized to nitric oxide which is an undesireable polutant. If oxygen levels are reduced so that combustion is carried out in any oxygen deficient or reducing atmosphere, nitric oxide formation is inhibited, but fuel combustion is less complete. This results in carbon monoxide and hydrocarbons being carried out of the combustor in the combustor flue gas and an attendant loss in fuel combustion efficiency.

It would therefore be desirable to provide a combustion process or system which achieves complete fuel combustion with minimal production of undesirable nitric oxide.

SUMMARY OF THE INVENTION

In accordance with the present invention, a combustion process for combusting nitrogen containing carbonaceous materials is provided that not only achieves desirable high fuel combustion efficiency, but also provides for reduced nitric oxide emissions. The present invention is based upon a dual stage combustion process in which the material to be combusted is first subjected to partial combustion in an oxygen deficient atmosphere. The partially combusted solids are then passed to a second combustion step in which substantially all of the remaining carbon is combusted in an oxidizing atmosphere. The flue gas resulting from the second combustion step contains nitrogen oxides, and particularly nitric oxide. The flue gas also contains excess oxygen. This flue gas is passed into contact with the partially combusted solids in the first combustion step. The nitrogen oxides are believed to be converted to molecular nitrogen by the carbon present in the partially combusted solids and thereby removed from the flue gas. The excess oxygen level of the flue gas is maintained to provide partial combustion only of the solids in the first combustion step.

The present inventions has particular application to combustion of carbon residues present in the spent shale produced during oil shale retorting operations. As a particular feature of the present invention, two fluidized bed combustors are utilized to carry out the desired dual stage combustion. The flue gas resulting from the second or complete combustion step is utilized as the fluidizing gas in the first or partial combustion step. The oxygen content of the fluidizing gas delivered to the second fluidized bed is maintained at levels to ensure complete carbon combustion and an excess of oxygen in the generated flue gas. The level of excess oxygen in the flue gas leaving the second fluidized bed is controlled so that partial combustion only of the solids in the first fluidized bed occurs.

Since the flue gas from the second fluidized bed is being utilized as the fluidizing gas for the first fluidized bed, the nitrogen oxides present in the flue gas are intimately contacted with the partially combusted solids in the first fluidized bed and thereby femoved. This produces a low nitrogen oxide flue gas exiting the first fluidized bed. In effect, the first fluidized bed is not only accomplishing partial combustion of carbon present in the spent shale, but is also removing nitrogen oxides from the flue gases generated in the second combustion step.

The counter-current flow dual stage combustion in accordance with the present invention may be carried out in separate combustion vessels or if desired may be carried out in a single unitary vessel having the first and second combustion stages separated by a flue gas permeable divider. In such a single vessel design, the second combustion stage is positioned directly below the first combustion stage so that the fluidizing gas injected into the lower second stage flows directly and uniformly up through the stage divider to provide the fluidizing gas for the first stage.

As a particular feature of such a staged unitary vessle design, a series of downcomer pipes are provided extending from the upper or first fluidized bed down to the lower or second fluidized bed. The downcomer pipes provide a means for transferring the solids from the upper fluidized bed to the lower fluidized bed in a manner which uniformly distributes the solids into the lower bed. Uniform distribution of solids in a fluidized bed for complete combustion of carbonaceous material is desirable. Non-uniform distribution of solids results in less than optimal carbon combustion. Although uniform distribution of solids into the first or upper fluidized bed is desirable, it is not especially critical since the upper fluidized bed is operated under reducing conditions to achieve partial combustion only.

The above discussed and many other features and attendant advantages of the present invention will become apparent as the invention becomes better understood by reference to the following detailed description when considered in conjunction with the accompanying drawings.

DETAILED DESCRIPTION OF THE INVENTION

The following detailed description of the invention will be limited to a description of its application to the combustion of combustible carbon residues present in the spent shale produced during oil shale retorting. The dual stage combustion in accordance with the present invention is particularly well-suited for spent shale combustion; however, the combustion process and system also has application in general to combustion of carbonaceous materials which contain nitrogen compounds. Such carbonaceous materials include oil shale, coal, tar sands, diatomaceous earth and the like.

Figure 1:
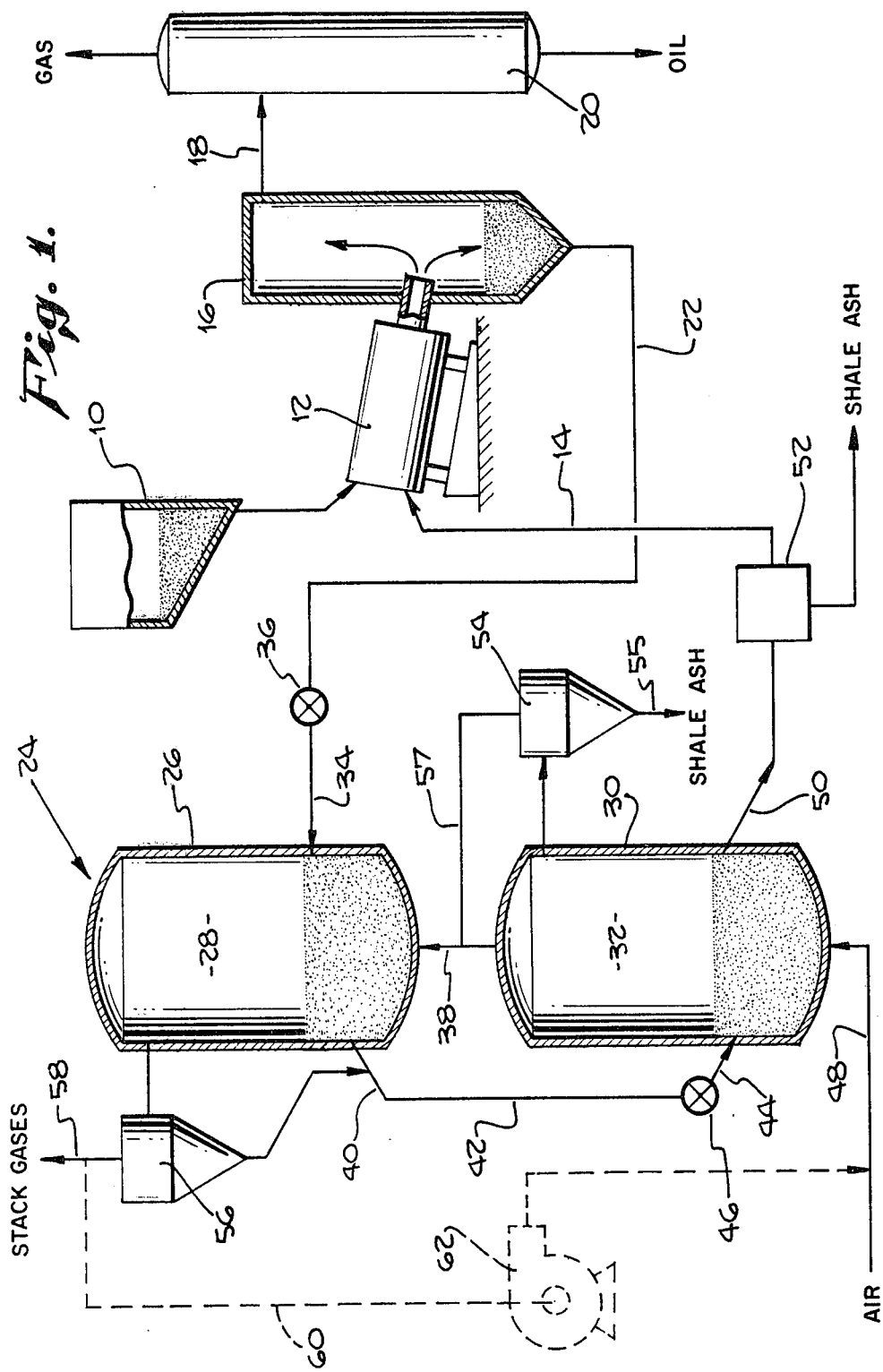
FIG. 1 is a schematic diagram of a preferred spent shale combustion system in accordance with the present invention.

FIG. 1 depicts a preferred oil shale processing system utilizing dual stage spent shale combustion in accordance with the present invention. The particular oil shale which is to be processd, is not important. Any of the common oil shales found in the United States and in other countries can be processed. Kerogen-lean shales as well as kerogen rich shales are suitable for treatment. The pyrolysis portion of the process maybe any of the well known processes which are conventional in nature.

Typically, the raw oil shale is crushed to suitable size and fed from a feed hopper 10 into a pyrolysis retort. Particle size will usually range between about ⅛ inch and ⅜ inch, but may be larger or smaller if desired. The raw oil shale may be preheated to temperatures near 500° F. to 600° F. if desired prior to pyrolysis. The preferred pyrolysis retort is a rotating retort as shown at 12. Other types of retorts including fluidized bed or moving bed are also suitble. In the rotating retort 12, the oil shale is mixed with heat carrying bodies introduced through line 14. The heat-carrying bodies are typically at a tempertaure between 1200° F. and 1400° F.. The heat carriers are added in sufficient amounts to the retort in order to maintain pyrolysis temperatures between 850° F. and 1200° F.. During pyrolysis in retort 12, the kerogen present in the oil shale is converted to product gases and oil.

The mineral residue remaining after pyrolysis is known as spent shale. The spent shale will include a combustible carbonaceous residue in amounts ranging up to approximately 10 weight % and higher depending upon the source of the oil shale and the retorting conditions. The amount of nitrogen in the carbonaceous material is not especially critical and may vary widely. Spent shale will usually have between 0.2 weight percent and 0.8 weight percent nitrogen.

The solids blend of spent shale and heat carrier along with product gases and oil are passed out of retort 12 into accumulator or separator 16. The gases and oil are separated from the solids blend and removed via line 18 to fractionating tower 20 and/or other downstream processing. The solids blend of spent shale and heat carrier is removed from the bottom of the accumulator 16 through line 22.

Any suitable heat carriers such as ceramic or alumina balls, sand, crushed rock or attrition resistant shale ash may be utilized. When heat carriers such as ceramic balls are used, they are separated from the spent shale and reheated in a separate ball heater. When heat carriers such as sand or attrition resistant shale ash are used, the particulate heat carrier may be passed with the spent shale to the combustor where they are directly reheated. The preferred embodiment employs such particulate heat carriers. Accordingly, the solids blend of spent shale amd heat carrier is passed to the preferred dual stage spent shale combustor as shown generally at 24.

The particular heat carrier utilized in the process is not critical.

It is preferred that combustion of the solids blend from line 22 be carried out in a fluidized bed. This is not absolutely necessary with other types of solids combustion configurations being suitable. The size of the spent shale and heat carrier solids is preferably small enough to allow adequate fluidization within the dual-stage combustor 24. Preferrably, the particles will be sized below one-half inch and more preferrably between one-eighth inch and three-eights inch.

The dual stage combustor 24 basically includes a first combustion vessel 26 which defines a first combustion zone 28 and a second combustion vessel 30 which defines a second combustion zone 32. The solids blend of spent shale and heat carrier is passed into the first combustion zone 28 through inlet means such as inlet 34 which includes valve 36 to control the rate at which solids are introduced into the fluidized bed combustion zone 28. The first combustion vessel 26 is operated under conditions to only partially combust the carbon content of the solids blend. The degree of partial combustion is not particularly critical so long as the carbon content of the solids blend does not go below about 0.5 weight %. The degree of combustion is regulated by controlling the oxygen content of the fluidizing gas introduced through line 38 and the feed rate of solids being introduced into the first combustion zone 28.

As a particular feature of the present invention, the flue gas from the second combustipn vessel 30 is utilized as the fluidizing gas introduced through line 38 into combustion zone 28.

A solids outlet 40 is provided for removing the partially combusted solids blend from the first combustion zone 28. The solids are then transferred through line 42 to inlet means such as inlet 44 for introducing the partially combusted solids into the second combustion zone 32. A valve 46 is provided for regulating the flow of partially combusted solids into the second combustion zone 32.

Air or other oxygen-containing gas is passed through line 48 into the bottom of the second combustion zone 32. The gas velocity is sufficient to fluidize the solids present in the second combustion zone 32. It is preferred that the gas velocity be between about 3 feet/second and 8 feet/second when particles within the described size range are being combusted.

The temperture in the second combustion zone is maintained between about 1200° F. to 1600° F.. An excess of oxygen is supplied in the fluidizing gases through line 48 to achieve substantially complete combustion of the remaining carbon content of the solids blend. This second combustion step produces a solids blend which is substantially free of carbon and may be removed through outlet 50 for recycling back to the retort for oil shale heating. The solids may be passed through a separator attriter 52 to remove excess or otherwise undesirable heat carrier or shale ash prior to cycling of the stream back to the retort 12.

During combustion in the second combustion zone 32, a hot flue gas containing oxygen and nitric oxides along with shale ash fines is produced. The shale ash fines are separated from the flue gas in cyclone 54 and discarded through line 55. The separated hot flue gas is passed through line 57 to line 38 and introduced with other flue gas from the second combustion zone into the first combustion zone 28. In accordance with fthe present invention, the nitric oxide level in the flue gas produced in the second combustion zone 32 is reduced when the flue gas is passed to the first combustion zone 28 as the fluidizing gas. Nitric oxide is the principal nitrogen oxide present in the second combustion zone flue gas. For spent shale having nitrogen levels in the range discussed above, nitric oxides will typically be present in amounts ranging from 300 to about 600 parts per million. As previously mentioned, the oxygen level in the first combustion zone 28 must be regulated to ensure that only partial combustion of the solids blend occurs. Accordingly, the oxygen content of the air or other oxygen containing gas introduced into the second combustion zone 32 through line 48 must be regulated to achieve the desired oxygen levels in the flue gas removed through line 38 in addition to achieving complete combustion of the carbon present on the solids in the second combustion zone 32. Preferably, the oxygen content of the flue gas from the second combustion zone 32 will be between 0.5 and ten percent by volume. More preferably, the oxygen level should be between one and four volume percent. This low level of oxygen is desired in the first combustion zone 28 in order to minimize carbon monoxide formation.

The temperature of the first combustion zone 28 is maintained at a temperature of between about 900° F. and 1400° F.. At this temperature, substantially all of the oxygen present in the flue gas from the second combustion zone 32 is consumed by or reduced by the excess of combustible carbon present in the solids blend. This produces a flue gas from the first combustion zone 28 which contains little, if any, oxygen. In addition, the nitric oxide present in the flue gas reacts with carbon and carbon monoxide in the fluidized bed to form nitrogen and carbon dioxide and thereby remove nitric oxide from the flue gas. It is believed that the nitric oxide is reduced by the carbon present in the first combustion zone 28 to form molecular nitrogen. Preferably, a large excess of carbon is present in the first combustion zone 28 for reaction with the nitric oxide introduced in the flue gas. Partial combustion of the carbon within the first combustion zone fluidized bed should be controlled so that the molecular ratio of carbon to nitrogen is at least 32 to 1 and preferably much higher.

The flue gas produced in the first combustion zone 28 also includes a certain amount of fine solids which are separated from the flue gas in cyclone 56 and transferred to outlet 40 where they are added to the partially combusted solids exiting the first combustion zone 28 for transfer to the second combustion zone 32 and final combustion therein.

After being stripped of entrained fines in cyclone 56, the flue gas produced in the first combustion zone 28 is passed through line 58 to downstream heat recovery and further processing. For spent shale combustion, the flue gas will typically contain from 0 to 100 parts per million nitric oxide which is a significant reduction over the 300 to 600 parts per million nitric oxide present in the flue gases resulting from the complete carbon combustion in the oxidizing atmosphere of the second combustion zone 32.

Since the combustion in the first combustion zone 28 is being carried out under sub-stoichemetric conditions, small amounts of carbon monoxide and uncombusted hydrocarbons may be emitted in the flue gas exiting line 58. If desired, conventional apparatus and processes may be utilized to remove these components from the flue gas. For example, any of the well-known thermal techniques for removing small amounts of carbon monoxide and hydrocarbons from flue gas may be utilized. Further, catalytic converter systems utilizing conventional catalysts may be employed.

If desired, regulation of the oxygen level in the fluidizing gas being introduced into the second combustion zone 32 may be accomplished by recycling a portion of the flue gas from line 58 through line 60 and blower 62. The flue gas in line 58 is particularly well-suited for diluting the fluidizing gas in line 48 to reduce oxygen levels since it is already heated to a relatively high temperature and contains little, if any, oxygen. Of course, other means for regulating the oxygen level of the fluidizing gas introduced through line 48 are possible.

Figure 2:
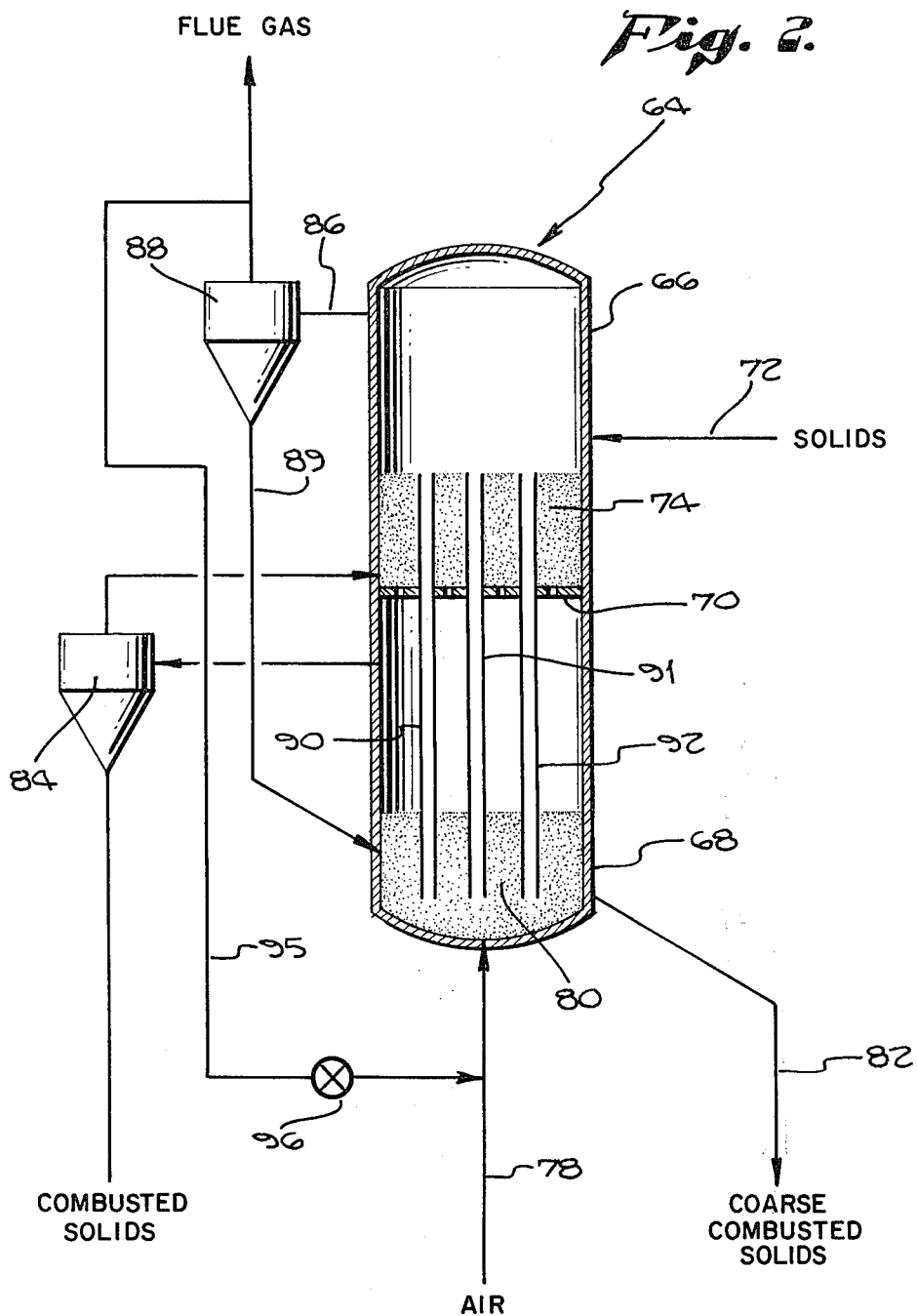
FIG. 2 is an embodiment of a preferred spent shale combustor in accordance with the present invention.

A preferred dual stage combustor is shown at 64 in FIG. 2. The combustor 64 includes a first stage 66 and a second stage 68. The first and second stages are separated by a perforated grating or screen 70. The perforations in screen 70 are large enough to allow passage of flue gas from the second stage 68 to the first stage 66 and sufficiently large to prevent plugging or blockage between the two stages. Perforations up to $\frac{1}{2}$ inch in diameter are suitable, with perforations of about $\frac{1}{4}$ inch diameter being preferred. The plate is preferably made from stainless steel or other strong corrosion resistant material.

The combustor 64 operates similarly to the dual stage combustor of FIG. 1 except that the two stages are combined into a single vessel 64. Solids are introduced through line 72 into the first stage 66 where they are fluidized with the oxygen and nitric oxide containing flue gases rising from the second stage 68. A fluidized bed 74 is formed in which the carbon content of the solids is partially reduced as discussed in accordance with FIG. 1. The partially combusted solids are then passed through downcomer pipes 90, 91 and 92 into the second combustion stage 68 where they are fluidized with oxygen containing gas introduced through line 78 to form fluidized bed 80. The use of downcomer pipes 90, 91, and 92 is especially desirable to promote uniform distribution of the partially combusted solids from the first combustion stage 66 to the second combustion stage 68. This uniform particle distribution is important in achieving optimum complete combustion of the carbonaceous residue present in the fluidized bed of the second stage 68. The number of downcomer pipes utilized to transfer solids from the first or upper fluidized bed 74 to fluidized bed 80 is not critical. Preferably, for a fluidized bed depth of three feet, one downcomer pipe should be provided for every five to fifteen square feet. Multiple point introduction of solids into the upper fluidized bed 74 by downcomer pipes or otherwise can be conducted, if desired; however, since the upper fluidized bed 74 is only partially combusting the solids, it is not as critical to provide uniform dispersal of the solids into the fluidized bed.

As previously discussed, sufficient oxygen is provided in the fluidizing gas through line 78 to combust substantially all of the carbon present on the solids and provide an excess of oxygen in the flue gas rising through screen 70 of about 1 to 10% by volume. The fluidization velocity of the gases flowing upward in both stages of combustor 64 is preferably between three feet per second and eight feet per second when particles within the described size ranges are being combusted.

The completely combusted solids are removed from the bottom fluidized bed 80 through outlet 82. The solids are then eigher removed from the system or recycled to the retort as is conventionally known and described above. The fines present in the flue gas are removed via cyclone 84 and discarded.

The flue gas rising from fluidized bed 80 passes through screen 70 and is utilized to fluidize bed 74. Additional fluidizing gas, if necessary, may be added to the botom of the first combustion stge 66. As previously discussed, the flue gas used to fluidize the first partial combustion stage is regulated so that the oxygen content is sufficient to only partially combust the carbon present. Further, the nitrogen oxides present in the flue gas are removed wholly or in part by contact with the fluidized bed 74. This results in a flue gas leaving fluidized bed 74 through line 86 which is essentially free of oxygen and has a reduced nitric oxide level. Any fines present in the flue gas are removed by cyclone 88 and transferred via line 89 to the fluidized bed 80 for complete combustion of remaining carbon.

The carbon level in the upper fluidized bed 74, as previously discussed, should be maintained to insure a high molecular ratio of carbon to nitric oxide. The temperatures within the lower and upper stages are maintained within those ranges previously discussed with regard to FIG. 1. Also, as in FIG. 1, the oxygen content of the fluidizing gas introduced through line 78 may be controlled by recycling the oxygen-free flue gas exiting cyclone 88 through line 95. The amount of flue gas recycled for use as fluidization gas in line 78 is controlled by valve 96.

Having thus described exemplary embodiments of the present invention, it should be noted by those skilled in the art that the within disclosures are exemplary only and that various other alternatives, adaptations and modifications may be made within the scope of the present invention. Thus, by way of example and not of limitation, if desired a multi-stage countercurrent combustor in accordance with the present invention is possible. For example, a three-stage combustor instead of a two-stage combustor is possible where complete combustion is not achieved until the third stage with flue gases being passed countercurrently from stage three to stage two and to stage one. Accordingly, the present invention is not limited to the specific embodiments as illustrated herein.

What is claimed is:

1. A process for staged combustion of solids containing combustible carbonaceous material and nitrogen comprising the steps of:
    passing said solids to a first combustion zone;
    adding sufficient oxygen confaining gas to said solids in said first combustion zone to partially combust said carbonaceous material to produce partially combusted solids and flue gas;
    separating said partially combusted solids from said flue gas;
    passing said partially combusted solids to a second combustion zone;
    adding sufficient oxygen containing gas to said partially combusted solids in said second combustion zone to combust substantially all of said carbonaceous material to produce combusted solids and flue gas containing oxygen and nitrogen oxides;
    separating said combusted solids from said flue gas;
    passing said second combustion zone flue gas to said first cmbustion zone to provide said oxygen containing gas to said first combustion zone, wherein the carbonaceous material in said first combustion zone is partially combusted and the amount of nitrogen oxides in said flue gas is reduced by the interaction of the nitrogen oxides with said solids in said first combustion zone.

2. A process according to claim 1 wherein said oxygen containing gas is introduced into said second combustion zone at a sufficient velocity and said partially combusted solids are of appropriate size to form a fluidized bed of partially combusted solids.

3. A process according to claim 2 wherein said oxygen containing gas is introduced into said first combustion zone at a sufficient velocity and said solids are of appropriate size to form a fluidized bed of solids.

4. A process according to claim 1 wherein said solids are selected from the group consisting of oil shale, spent shale, coal and tar sands.

5. A process according to claim 4 wherein said solids include spent shale.

6. A process according to claim 5 wherein the temperature in the first combustion zone is between 900° F. and 1400° F.and the temperature in the second combustion zone is between 1200° F. and 1600° F..

7. A process according to claim 5 wherein the solids include an inert heat carrier.

8. A process according to claim 3 wherein the content of carbonaceous material in said partially combusted solis is above 0.5 weight percent.

9. A process according to claim 5 wherein the amount of oxygen in said oxygen containing gas added to said first combustion zone is between about 0.5 and 10 volume percent.

10. A process according to claim 9 wherein the amount of oxygen is between about 1 and 4 volume percent.

11. A process according to claim 1 wherein said second combustion zone is located below said first combustion zone in a common combustor, said combustion zones being separated by a common gas permeable divider whereby the flue gas from said second combustion zone can flow upward into said first combustion zone.

12. A process according to claim 11 wherein said partially combusted solids are passed to said second combustion zone through one or more downcomer pipes.

13. A process according to claim 1 or 3 wherein a portion of the flue gas from said first combustion zone is recycled as part of said oxygen containing gas to said second combustion zone to maintain desired oxygen levels in said second combustion zone.

14. In a process for combusting carbonaceous material containing nitrogen in an oxidizing atmosphere to produce heat, substantially carbon free solids and a first flue gas containing nitrogen oxides and oxygen, wherein the improvement for removing nitrogen oxides from said flue gas comprises:

contacting said first flue gas with said carbonaceous material prior to combustion in said oxidizing atmosphere to partially combust said carbonaceous material to form heat, partially combusted solids and a second flue gas having less oxygen and nitrogen oxides than said first flue gas;

separating said partially combusted solids from said first flue gas; and combusting said partially combusted solids in said oxidizing atmosphere.

15. The improved process of claim 14 wherein said carbonaceous material is spent shale.

16. The improved process of claim 15 wherein the temperature in said oxidizing atmosphere is between 1200° F. and 1600° F. and the temperature of said partial combustion is between 900° F. and 1400° F..

17. The improved process of claim 16 wherein the oxidizing atmosphere combustion and the partial combustion are carried out in fluidized beds.

18. The improved process of claim 17 wherein the amount of oxygen in said first flue gas is between about 0.5 and 10 volume percent and the carbon content of said partially combusted spent shale is above about 0.5 weight percent.

19. A staged combustion system comprising:
a first combustion vessel defining a first combustion zone;
a second combustion vessel defining a second combustion zone;
first inlet means for introducing solids containing combustible carbonaceous material and nitrogen into said first combustion zone;
first outlet means for removing partially combusted solids from said first combustion zone;
second inlet means connected to said first outlet means for introducing said partially combusted solids into said second combustion zone;
second outlet means for removing combusted solids from said second combustion zone;
first combustion gas inlet means for introducing an oxygen containing gas into said second combustion zone to combust said carbonaceous material to form combusted solids and a first flue gas containing oxygen and nitrogen oxides;
first flue gas outlet means for removing said first flue gas from said second combustion zone;
second combustion gas inlet means connected to said first flue gas outlet means for introducing said first flue gas into said first combustion zone;
means for controlling the amount of oxygen in said first flue gas to combust less than 99.5 weight percent of said carbonaceous material in said solids to form said partially combusted solids and a second flue gas having less nitrogen oxides than said first flue gas; and
second flue gas outlet means for removing said second flue gas from said first combustion zone.

20. A staged combustion system according to claim 19 including:
means for maintaining the temperature of said first combustion zone between 900° F. and 1400° F.; and
means for maintaining the temperature of said second combustion zone between 1200° F. and 1600° F..

21. A staged combustion system according to claim 19 wherein said means for controlling the amount of oxygen in said first flue gas includes means for recycling at least a portion of said second flue gas to said first flue gas.

22. A staged combustion system according to claim 21 wherein said second combustion vessel is located below said first combustion vessel said vessels having a common gas permeable wall through which said first flue gas from said second combustion zone passes through to said first combustion zone.

23. A staged combustion system according to claim 22 wherein said first outlet and second inlet means include one or more downcomer pipes extending betwen said first and second combustion zones.

* * * * *